United States Patent
Olkey et al.

[11] Patent Number: 6,032,573
[45] Date of Patent: Mar. 7, 2000

[54] METHOD AND APPARATUS FOR MAKING CHEESECAKE

[75] Inventors: David Olkey; Charles Caruso, both of Little Neck, N.Y.

[73] Assignee: Carousel Foods, Inc., Farmingdale, N.Y.

[21] Appl. No.: 09/122,952

[22] Filed: Jul. 27, 1998

Related U.S. Application Data

[63] Continuation-in-part of application No. 08/658,181, Jun. 4, 1996, abandoned
[60] Provisional application No. 60/003,896, Sep. 18, 1995.

[51] Int. Cl.⁷ .............................. A23L 1/00; A23L 3/00; B65B 25/16; B65B 25/22
[52] U.S. Cl. .............................. 99/356; 53/510; 53/520; 99/352; 99/355; 99/386; 99/443 C; 99/517
[58] Field of Search .................... 99/339, 340, 352–356, 99/386, 443 R, 443 C, 477–479, 468, 517; 53/117, 247, 122, 553, 494, 537, 510, 520, 514, 516, 425, 440; 426/392, 412, 523, 524, 509, 128, 394, 396, 403

[56] References Cited

U.S. PATENT DOCUMENTS

| | | |
|---|---|---|
| 3,688,682 | 9/1972 | Good ................................ 99/356 X |
| 3,891,779 | 6/1975 | Robinson .......................... 99/356 X |
| 3,993,788 | 11/1976 | Longenecker ................... 426/523 X |
| 4,120,984 | 10/1978 | Richardson et al. .............. 426/412 |
| 4,269,216 | 5/1981 | Corominas ...................... 53/510 X |
| 4,391,080 | 7/1983 | Brody et al. ...................... 53/426 |
| 4,478,140 | 10/1984 | Bullock ............................. 99/356 X |
| 4,594,255 | 6/1986 | Wilson et al. ................... 426/392 X |
| 4,655,125 | 4/1987 | Ishida et al. .................... 426/523 X |
| 4,732,772 | 3/1988 | Nolte ................................ 53/520 X |
| 5,477,778 | 12/1995 | Kuwahara ........................ 99/443 C |
| 5,701,809 | 12/1997 | Busk ................................. 99/456 X |
| 5,934,186 | 8/1999 | Alberga et al. .................. 53/520 X |

*Primary Examiner*—Timothy Simone
*Attorney, Agent, or Firm*—Bauer & Schaffer, LLP

[57] ABSTRACT

A cheesecake batter is baked in individual cups as it is continuously moved from one end of an oven to the other. Thereafter, it is cooled by being transferred to a cooling table covered with a hood. The cooling table and the hood are arranged in line with the other end of the oven, and contains a downward laminar sterile air flow to envelop the baked cheesecake batter on the cooling table. In addition, the cooling table and the hood are spaced from the other end of the oven a distance in which the flow of heated vapor from the oven react and create a vacuum, thereby maintaining the baked cheesecake batter under constant sterile conditions, as it moves from the oven to the cooling table.

13 Claims, 5 Drawing Sheets

METHOD AND APPARATUS FOR MAKING CHEESECAKE

This application is a continuation-in-part of Ser. No. 08/658,181, filed Jun. 4, 1996, now abandoned which is based on U.S. Provisional Application No. 60/003,896, filed Sep. 18, 1995 from which benefit is claimed.

FIELD OF THE INVENTION

The present invention relates generally to a commercial baking apparatus and process for cheesecake and, more particularly, to an automated apparatus and method for producing sterile cheesecake, which is stable and capable of maintaining its sterility for at least six months without preservatives and without refrigeration.

BACKGROUND OF THE INVENTION

Cheesecake is one type of food which has maintained its popularity amongst the baker and consumer alike. Cheesecake is typically made by the home baker by mixing a variety of ingredients including a major portion of milk or milk products to form a batter, placing the batter into a baking container, placing the baking container into an oven, sometimes within a water bath, at a preset temperature for a certain period of time sufficient to bake the cheesecake, removing the cheesecake from the oven, allowing the cheesecake to cool to room temperature in an ambient environment and placing the cheesecake in a cold environment for at least twenty-four hours before serving.

Home-baked cheesecake is usually consumed within 24 to 72 hours of the time it is removed from the oven as it cannot be stored for a very long time, even in a cold environment such as the one provided by a refrigerator since many changes occur rather quickly to the palatability and texture of the cheesecake. Such changes may even have serious consequences on the health of those who consume the cheesecake if the time for which the cheesecake has been stored in the refrigerator or the temperature of the refrigerator have been such that they have allowed for bacteria and mold to develop and grow either on or within the body of the cheesecake.

As the demand for cheesecake has grown steadily with the growing population and as more and more home bakers' time is taken up with working outside the home, commercial bakers have sought to mass-produce cheesecake. Such mass production and attempts at marketing this delectable dessert has led to the expansion of equipment and adoption of techniques which include: (a) automated on-line mixing of ingredients; (b) specialized baking forms and molds; (c) computer-controlled industrial size ovens; (d) automated transfer of ingredients throughout the baking method through the use of conveyors and other movers; and (e) automated packaging and labeling of baked goods. Despite all of these and other features, which have increased the speed by which commercial cheesecake can be made, such features often have a negative impact on the taste and quality of the cheesecake produced. More importantly, however, such techniques and equipment have failed to change the process of mixing, baking, cooling, serving the cheesecake and/or prolonging the storage time and/or shelf life of the cheesecake prior to consumption.

Commercial cheesecake, i.e. factory baked cheesecake generally sold in retail bakeries and supermarkets, has a very short shelf-life due to its high susceptibility to spoilage. Such spoilage is probably due to its milk and other highly perishable ingredients. Thus, commercially baked cheesecake must either be refrigerated, frozen, or baked with preservatives. Freezing most definitely spoils the taste. Refrigeration must be carefully monitored and is effective for only very short periods of time. As for using chemical preservatives as ingredients for the cheesecake to prolong its shelf life, it is not a desirable alternative because (a) such preservatives affect the flavor and other physical characteristics of the cheesecake; and (b) in view of the general health conscious attitudes adopted by the consuming public at large, use of such preservatives will most likely lead to a drop in sales and consumability of the commercially baked cheesecake. More importantly, however, is that no matter which one of these three methods is used, the shelf or storage life of commercial cheesecake is relatively short and, when exceeded, results in a great deal of spoilage and return of cheesecakes to the baker for credit or replacement. Such returns translate to economic loss for the bakers and, by extension, to an increase of cheesecake prices to the consumer.

It is, therefore, an object of the present invention to provide a baking process and method for commercially available cheesecake which results in a product of such purity and lasting characteristics that it may be stored, transported and displayed without refrigeration.

It is a further object of the present invention to provide a commercially baked cheesecake having a long shelf life under normal atmospheric conditions, without any freezing, refrigeration or preservatives whatsoever.

Still another object of the invention is to provide a baking process for commnercially available cheesecake, the cheesecake having a flavor, aroma and taste similar to that of freshly made home-baked cheesecake, without needing preservatives, freezing or refrigeration to maintain its relatively long shelf life.

The objects and advantages together with others will be apparent from the following disclosure of the present invention.

SUMMARY OF THE INVENTION

According to the present invention there is provided an apparatus and method for producing non-refrigerated, preservative-free cheesecake having extended shelf-life.

Such apparatus includes an oven with means for conveying and baking cheesecake batter in individual cups from one end to the other and a cooling table arranged in line with the oven. As the baked cheesecake batter in the individual cups are discharged from the oven they are transferred via conveying means to the cooling table.

The cooling table itself is covered by a hood. The hood is outfitted to introduce sterile air into the hood so as to create a downward laminar sterile air flow, which envelopes the cooling table and the baked cheesecakes that are moving across the surface of the cooling table.

Furthermore, the cooling table and the hood are spaced from the other end of the oven a distance in which the flow of sterile air from the cooling table and the flow of heated vapor from the oven interact to maintain the baked cheesecake in the individual cups under constant sterile conditions, as it moves from the oven to the cooling table.

Full details of the present invention are set forth in the following description of the invention.

DETAILED DESCRIPTION OF PREFERRED EMBODIMENTS

Figure 1:
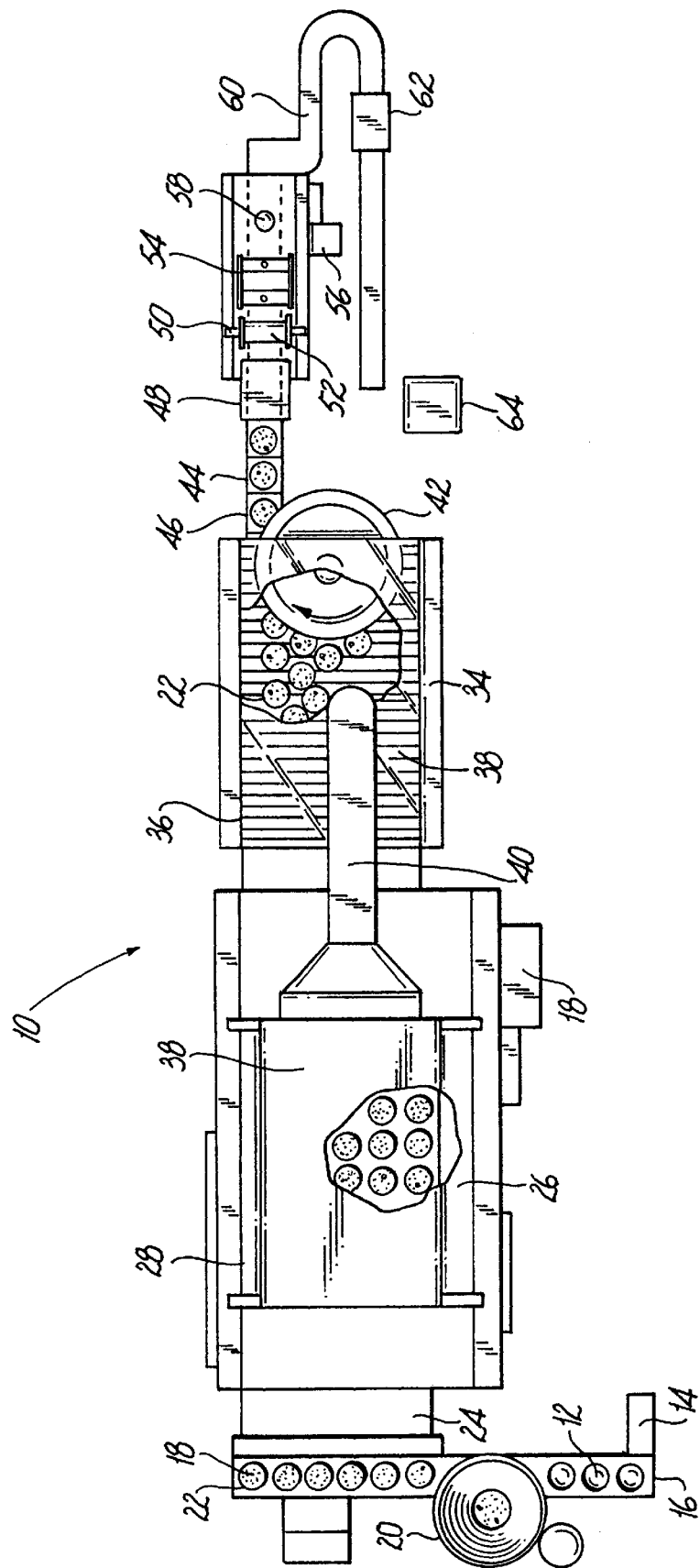
FIG. 1 is a top plan view of an apparatus by which the preferred method of the present invention may be effected.
Figure 2:
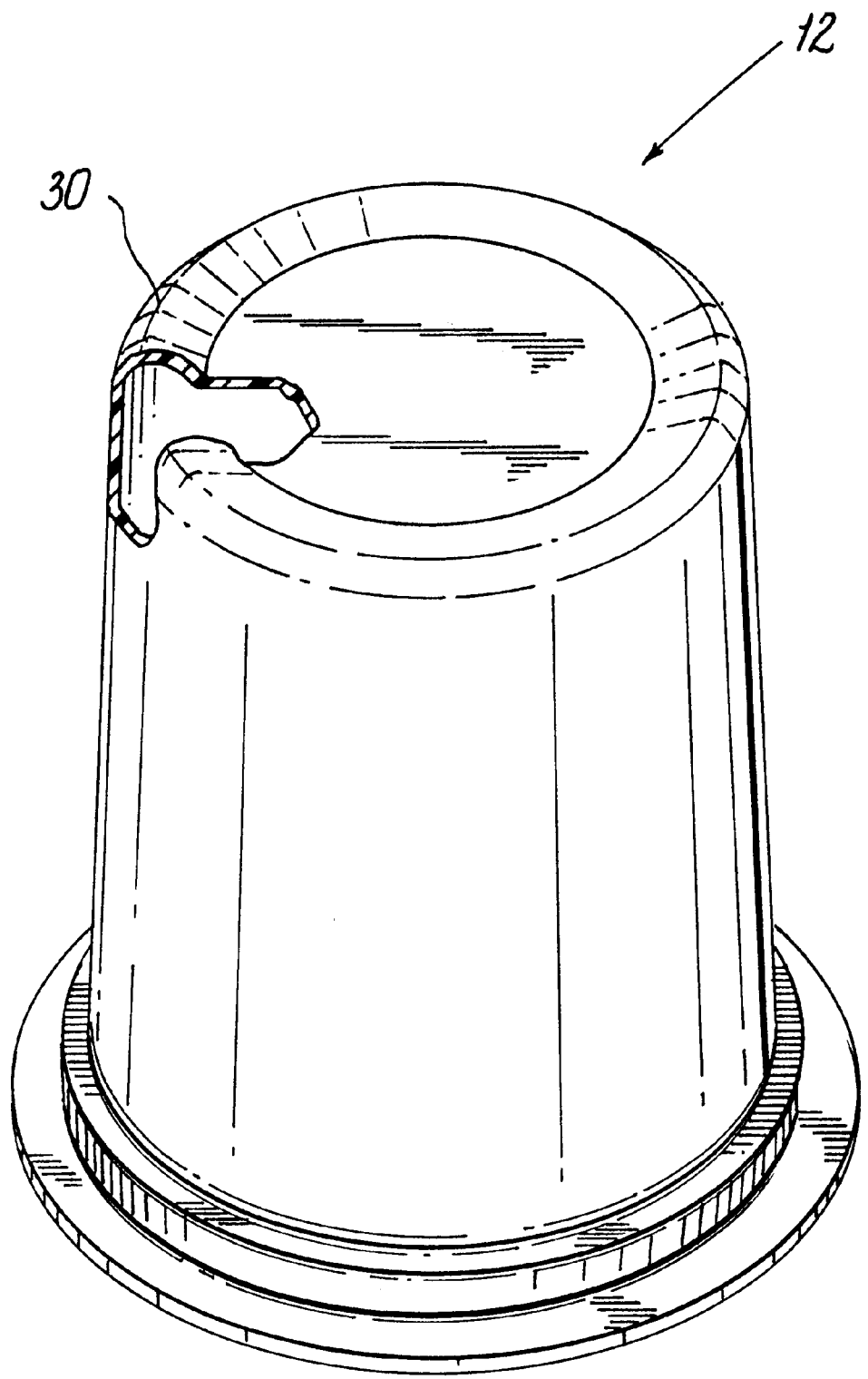
FIG. 2 is a perspective view of a baking cup employed.
Figure 3:
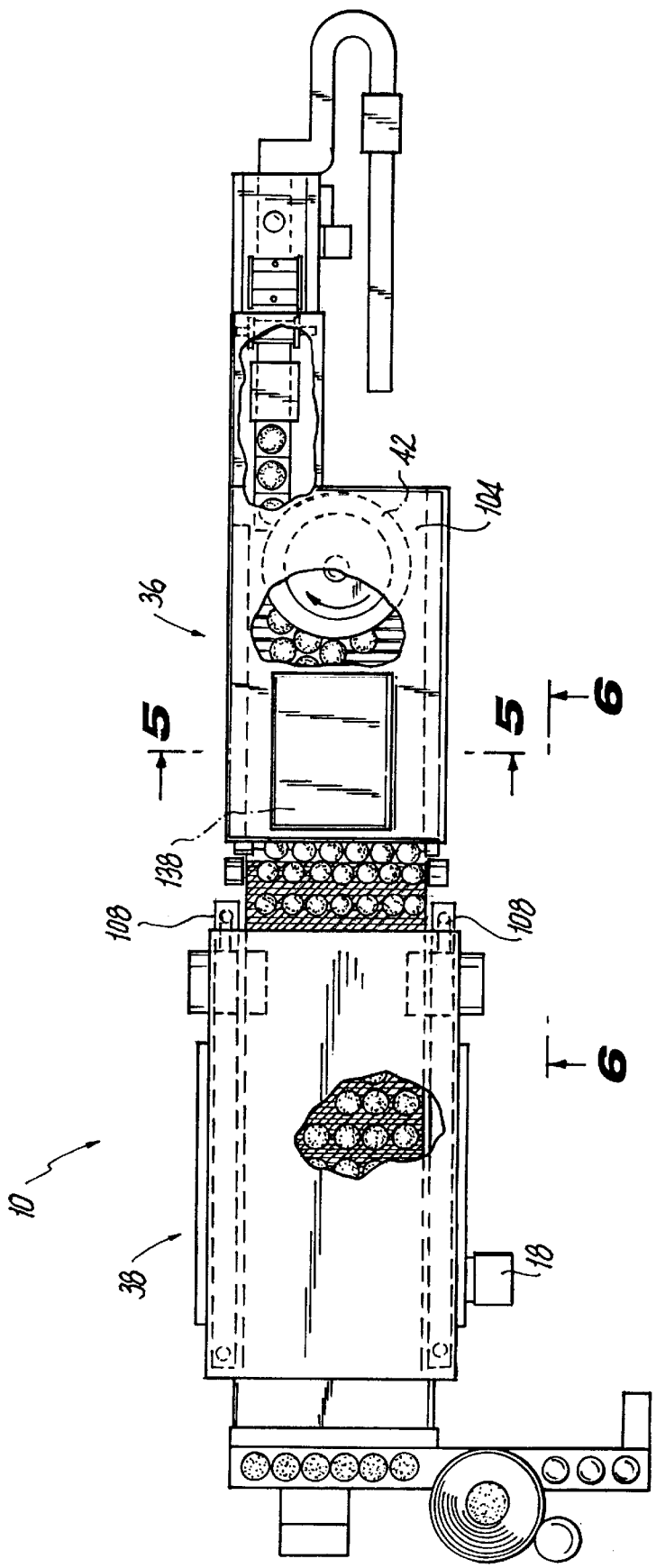
FIG. 3 is a view similar to FIG. 1, showing an alternate embodiment.

Referring now to FIGS. 1–3, wherein like numerals are used to indicate like elements throughout, there is shown in FIG. 1 the equipment for making non-refrigerated, preservative-free cheesecake, having an extended shelf-life, which has the form of an assembly line, generally designated 10. The assembly line 10 comprises a series of conveyors 14, 16 and 24, which move items through the assembly line 10 in a generally left to right flow.

Empty cups 12 which may be plastic or metal foil are dispensed from a cup dispenser onto conveyor 14 in which in turn moves the cups 12 onto infeed conveyor 16 which travels transversely to the assembly line. The cups 12 are dispensed by the cup dispenser automatically at a preprogrammed rate within a defined cycle. The cup dispenser is electrically linked to a control unit 18 located for convenience midway along the assembly line 10. The control unit 18 is encoded with cycle programming data to regulate the timing and rate at which the cups 12 are dispensed from the cup dispenser. The control unit 18 is also electrically linked to other components of the assembly line 10 to control the timing and rate of those components and maintain a defined operating cycle.

Empty cups 12 travel on infeed conveyor 16 and are filled with a predetermined amount of batter as they pass beneath the batter hopper 20. An electrical eye, which is electrically linked to the control unit 18, is disposed adjacent the hopper 20, and when occluded by an empty cup 12, signals the control unit 18 to in turn signal the hopper 20 to release a given amount of batter into the empty cup 12. The batter constituting conventional cheesecake batter, excluding preservatives, but including milk, flavorings, sugars, etc. is premixed off-line and stored in hopper 20 in close proximity to the infeed conveyor 16. Filled cups 22 travel along the infeed conveyor 16 until such time as a given number of cups are filled. When this occurs, the given number of cups are translated in a file, onto a main conveyor 24, set at right angles to the conveyor 16. The cups can then move through oven 26 simultaneously from left to right. The given number of the filled cups 22 are sensed by a photo eye which is electrically linked to the control unit 18 which in turn causes the translatory movement, while commencing a new cycle for filling empty cups with batter. The filled cups 22 are moved by the main conveyor 24 through the oven 26. Oven 26 is also electrically connected to the control unit 18 and its operating panels are regulated according to preprogrammed baking criteria such as baking time and temperature.

The oven 26 can preferably be 12 feet long and preferably 3 feet wide and has a temperature range of 100–700 degrees Fahrenheit. The main or oven conveyor 24 is driven at a controlled speed to move the filled cups 22 through the oven at a rated time to insure sufficient dwell time in the oven to complete baking. The oven heat is applied conventionally.

The oven used is not a conventional convection oven. Such an oven can be generally described as a heating chamber with a door that seals to keep the heat within the chamber and a vent that allows excess heat to escape, thereby allowing the chamber to achieve a pre-set temperature. Rather, the oven used in the present method can essentially be described as a heating tunnel with an entrance and an exit. The filled cups 22 continuously enter and exit the heating tunnel by being moved by the main conveyor 24 through the entrance of the oven, through the full length of the oven to be finally discharged through the exit of the oven fully baked, perfectly colored, and absolutely sterile.

The sterility of the cheesecake is achieved through two factors: (a) the high temperature at which the oven is maintained and the cheesecake is baked; and (b) the positive pressure maintained within the oven. Specifically, the temperature of the batter in the filled cups 22 immediately prior to being moved into the oven by the main conveyor 24 is approximately 60 degrees Fahrenheit (60° F.), i.e. approximately 16 degrees Celsius (16° C.). As the main conveyor 24 moves the filled cups 22 through the hot oven, the cheesecake batter is baked, giving off water in the form of moisture. This moisture is converted to steam, which expands rapidly to fill up the entire oven chamber and ultimately to escape out of both ends of the oven. During a day of continuously and serially baking cheesecakes, there is an average of approximately 4 cubic feet of water vapor per minute escaping out of both ends of the oven. This positive vapor pressure continuously escaping out of both ends of the oven prevents any cold and contaminated air from entering the oven and ultimately contaminating the cheesecakes.

In order to prevent uneven heating of the batter in the filled cups 22 and scorching of the bottom of the filled cups 22 as they lie on the main conveyor 24 and as they are directed through the oven 26, the cups can be shaped so as to have a peripheral rim 30 (FIG. 2) on their bottom wall, raising the bottom wall itself so that the wall does not fit flat against the surface of the conveyor. The conveyor may be made with an array of small pedestals or the like on which the filled cups 22 rest above the surface of the conveyor. The conveyor may also be made in the form of a chain link so as to avoid a completely solid surface.

After a set period of baking (generally about twenty minutes), the main conveyor 24 has moved the filled cups 22, now containing the baked cheesecakes, out of the downstream end of the oven 26, i.e. the exit of the oven, onto a separate cooling table 34. The cooling table 34 preferably consists of a plurality of freely rotatable rods, closely spaced and parallel to each other so that each cup can rest and move freely over two or more rods simultaneously. The spacing of the rods permits heat and air to flow freely down, about and over the filled cups 22 containing the hot baked cheesecake. The table 34 is covered by a cooling hood 36, preferably U-shaped of at least a foot or more in height, which may preferably be made of clear plastic so that the completed baked product is visible. The sides of the cooling hood extend well below the top surface of table 34.

A 0.12 micron HEPA filter 38 is mounted on the top of the oven 26. The HEPA filter is provided with a duct 40 which extends over the hood 36 covering the cooling table 34. The end of the duct 40 extends through the hood 36 into communication with the interior between the hood and the cooling table thereby providing sterile air to the interior of the cooling hood 36. The operation of the HEPA filter controlled by the control unit is caused to continuously feed sterile air to the interior of the cooling hood 36 on the baked goods on the cooling table 34. While on the cooling table 34, the sterile air flowing from HEPA filter 38 is directed onto the baked cups 22. specifically, the cooling hood 36 is maintained under a positive linear air flow of 2×708 cubic feet per minute (c.p.m.). This positive linear air flow together with the 0.12 micron HEPA filter permits an efficiency of 99.9995% sterility to be achieved. Furthermore, as the sterile air is forced into the cooling chamber from the HEPA filter through the duct, the width of the cooling chamber/hood has a pooling effect by which air being used through the duct creates a relatively stable layer as it enters the wider opening of the hood. This layer tends to remain close to the top of the hood until it is displaced by the subsequent influx of sterile air to thereby create a laminar flow of sterile air from the top of the hood to the cooling table, and below. As a result, the cool sterile air is not just simply blown onto the cooling cheesecakes on the table 34. To blow cold air is, in fact, totally undesirable because while directly blown sterile air on top of the surface of the hot baked cheesecake would rapidly cool the cheesecake, it would collapse the surface of the cake and ruin its appearance. Rather, the pooling effect of the sterile air downwardly over the product in laminar flow, i.e. nonturbulent flow, and in layers causes the cheesecakes to become gently a washed, surrounded and cooled by the sterile air. The sterile air, which by now has cooled the cheesecake has itself become significantly warmer than when it was at the top of the hood. The warmer sterile air is forced out of the hood through the lower open end of the hood and around the table and escapes into the environment below. This in turn prevents the cooled cheesecakes from coming into contact with nonsterile atmospheric air external to the cooling hood. Thus, the product is cooled under a laminar flowing, virtually sterile atmosphere.

It was found that when the exit of the oven 26 was immediately adjacent to, i.e. abutting, the entrance to the hood 36, so that the exiting cheesecakes immediately entered the cooling hood, the exiting pressurized vapor escaping the oven and the laminarly downwardly flowing cool sterile air created a temperature differential that was so extreme, it interfered with the laminar flow. Furthermore, it created such an air turbulence within the cooling hood that it completely countermanded any cooling effect on the cheesecakes, thereby necessitating the extension of the cooling time of the cheesecakes in the cooling hood to an impractical level. The problem was solved by separating the oven from the hood and creating a space, i.e. a gap between the oven and the hood as seen in FIG. 1. Thus, as the cups 22 containing the baked cheesecake are discharged from the oven 26, they travel through the gap via the main conveyor 24 and into the cooling hood 36. The rest or dwell time on the cooling table even for a short period of time is now sufficient to allow the baked cheesecake to cool to the touch and to be fully treated by the HEPA sterile atmosphere. It is the existence of this gap between the oven and the hood that effectively produces an air baffle created by the opposition of the heated vapor flow from the exit of the oven and the cooled air flow from the entrance of the hood, which further insures the sterility of the cheesecake.

The baked cups 22 on the cooling table 34 are continuously pushed forward by the succeeding baked cups 22 discharged from the oven 26 and pushed through the gap and into the hood. As the cooled cups 22 leave the table 34, they are pushed onto a motor driven turntable 42 spinning in a clockwise direction at a rate controlled by control unit 18. The turntable 42 is provided with guide means spaced above its upper surface to arrange the cups into a single file for transfer onto a single line conveyor 44. single line conveyor 44 advances the filled cups to an infeed device 46 of a foil applicator 48. Infeed device 46 controls the spacing of the filled cups as they are advanced so that the foil applicator 48 may apply a sized piece of foil 50 cut from an endless roll of foil 52 onto the top of the cooled baked cup 22, after which the foil 50 is sealed on the cooled baked cup 22 by a heating device 54. The sealed cups are then moved by the single line conveyor 46 past a vacuum waste removal device 56 which suctions spilled batter, foil and the like from the exterior of the sealed cups.

The sealed cup 22 containing the baked cheesecake is then transferred onto an accumulating conveyor 58 to move to a labeling machine 62, which automatically places a label onto the foil of sealed cup 22. The accumulating conveyor 58 moves the sealed cups 22 to a packing station where the sealed cups are manually removed from the conveyor 58 and packaged, a plural number at a time, in a shipping carton and finally placed on platform 64.

An embodiment which has been found to be quite advantageous and helpful in producing cheesecake in a continuous sequence of uninterrupted baking, cooling and sealing is shown in FIGS. 3–6.

Those elements which are the same shown earlier in FIGS. 1 and 2 bear the same numerals in FIGS. 3–6 and, therefore, their description is no being repeated.

Figure 5:
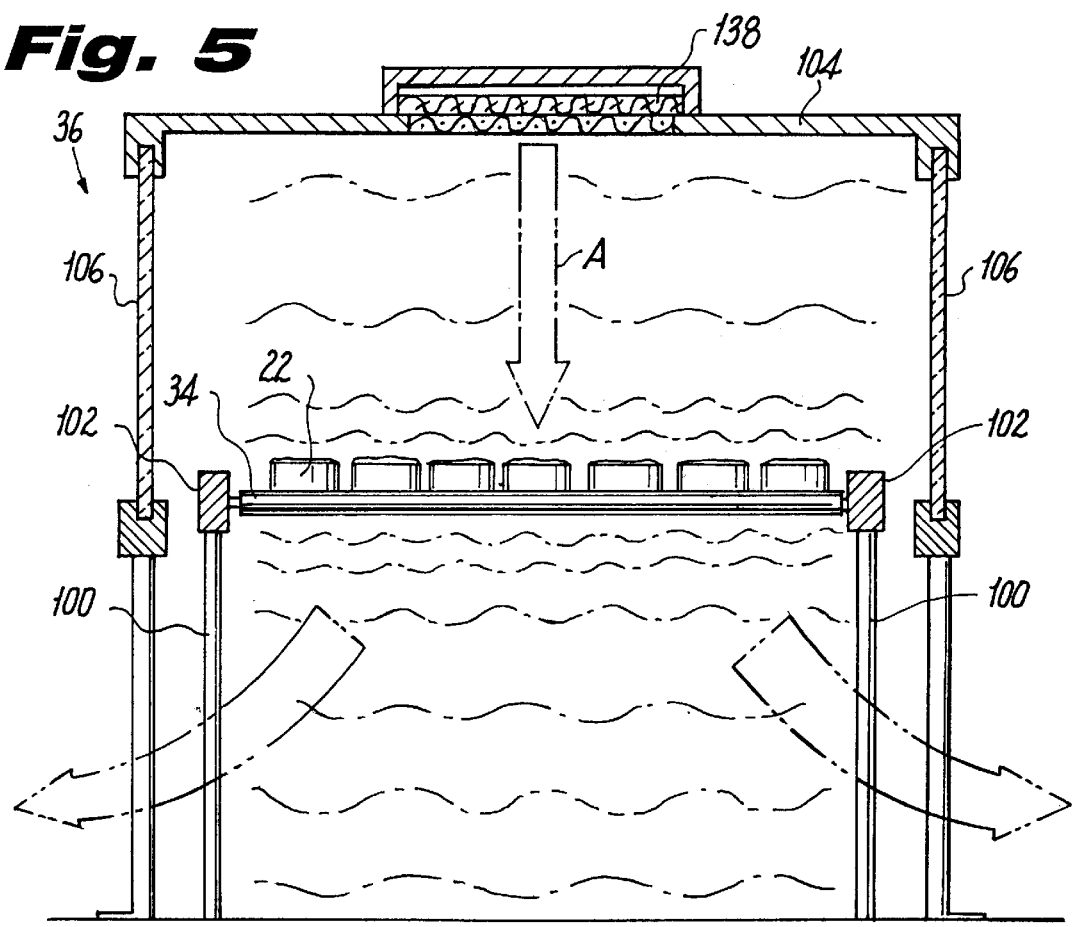
FIG. 5 is an enlarged sectional view of the apparatus takes along line 5—5 of FIG. 3.

However, it will be seen in FIGS. 3 and 5 that the HEPA filter 138 is placed on the hood (eliminating the need for a duct) and the cooling hood extends over elements 44–54 of the sealing section so that it is insured that even the small space between the cooling table and the sealing means is within the sterile HEPA atmosphere.

As seen more clearly in FIG. 5, the cooling table 34 is mounted on a series of spaced legs 100, allowing air to flow outwardly. The conveyor rollers forming the table are journalled in a horizontal beam 102 mounted on top of the legs. The U-shaped hood itself is mounted on a horizontal beam 104 secured to the top of a second pair of spaced legs 106 also permitting flow of air outwardly to the atmosphere. The legs 106 are shorter than the legs 100 supporting the table so that the cooling hood 36 consequently extends below the table as previously indicated. As seen by the arrows in FIG. 5, the laminar cooling air flows downwardly in a series of waves as seen by the dot dash lines and exit as previously described from the cooling section below the cooling table after enveloping and cooling the cups 22.

Figure 6:
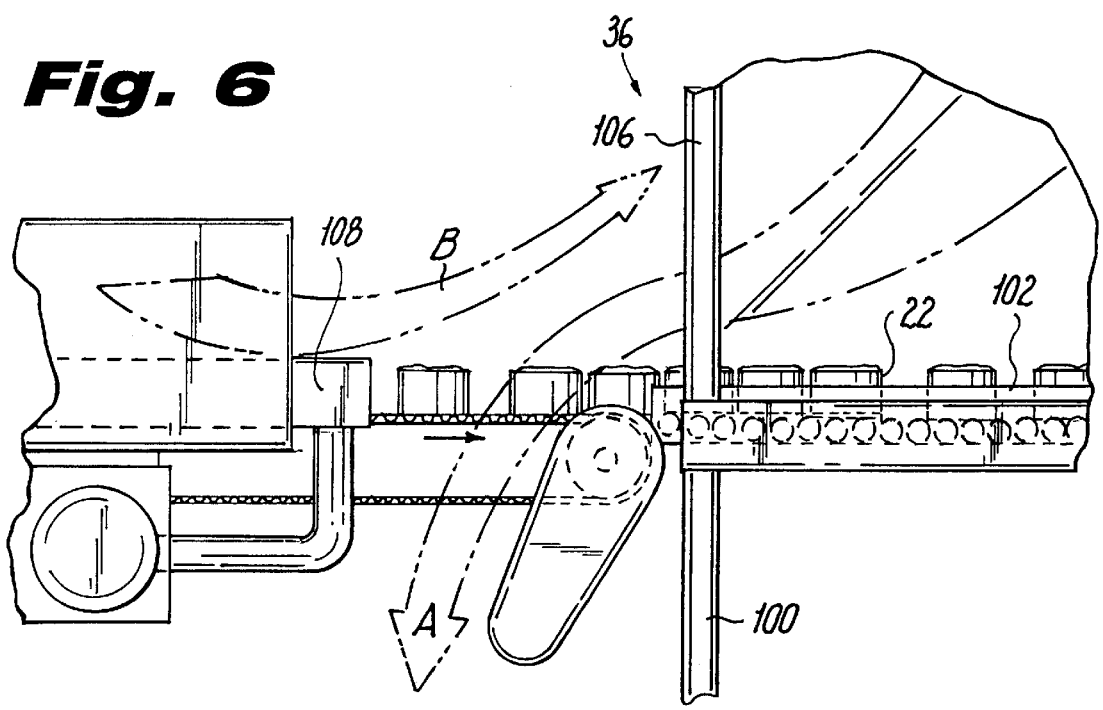
FIG. 6 is an enlarged elevated view partially broken away of the section of the apparatus in the direction of line 6—6 of FIG. 3.

FIG. 6 illustrates the baffle created by the sterile cooling air (arrow A) escaping from the entrance to the cooling hood in opposition to the hot vapor (arrow B) escaping from the exit of the oven. Specifically, this baffle diverts a) the vapor's flow away from the cooling hood 36 and up into the surrounding processing area; and b) the laminar flow of the sterile air away from the hot oven and down into the surrounding processing area, at a speed sufficient to interact and create a vacuum to prevent any contaminated atmospheric air from entering either the oven or the cooling hood 36, and maintain the baked cheesecakes under constant sterile conditions, as they move from the oven to the hood.

Figure 4:
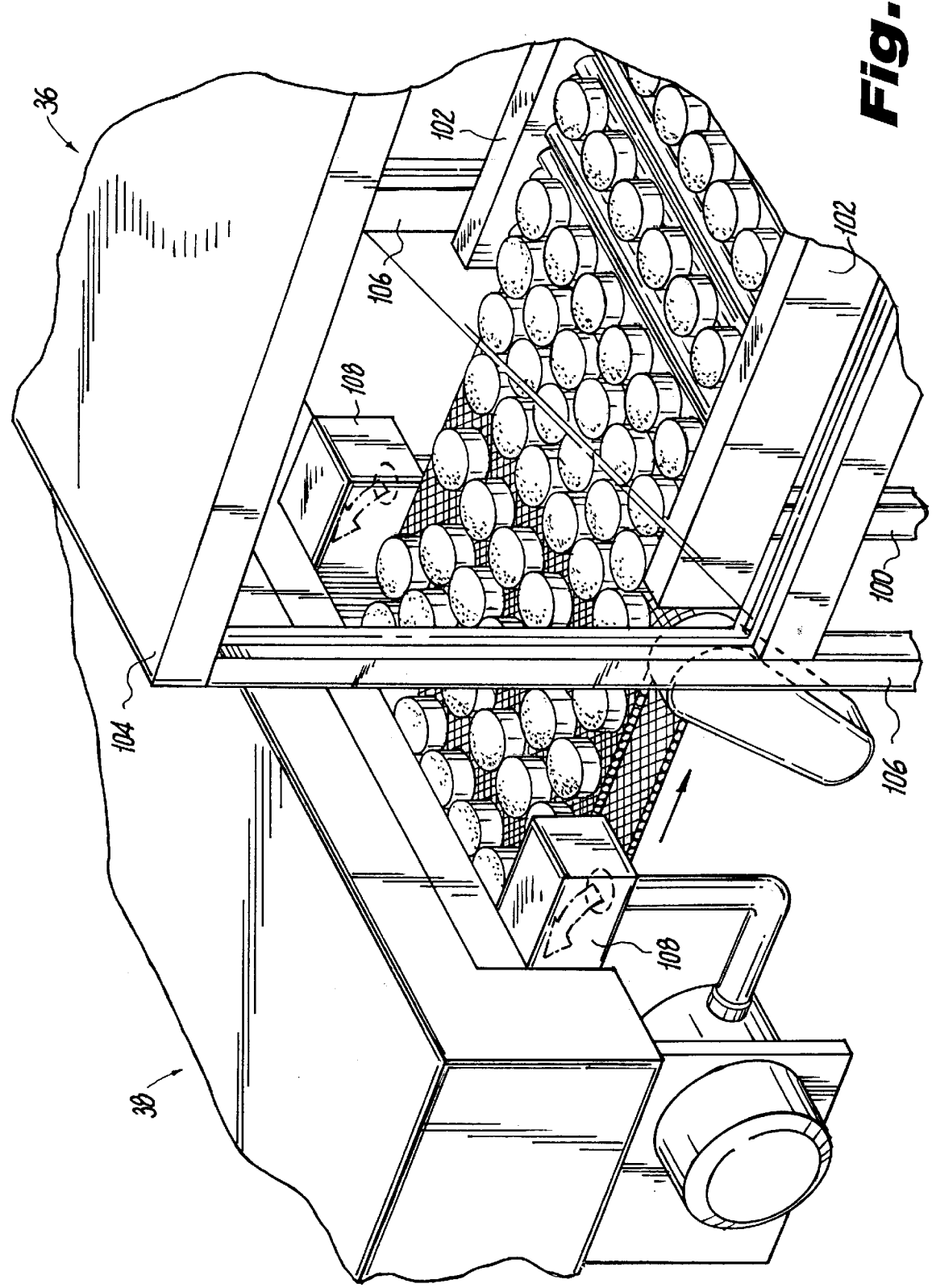
FIG. 4 is an enlarged perspective view looking from the cooling table into the oven.

As previously indicated, the oven is an unconventional convection oven having its heating elements only on its ceiling, radiating the heat downwardly onto the batter in cups 22. To insure a more equal distribution of the heat without the use of additional heat sources or elements, there is placed, as seen in FIGS. 3, 4 and 6, a heat sink 108 along each side of the conveyor within the oven. Each heat sink comprises a tubular duct extending the length of the oven and to which is connected an air pump 110 feeding cooled air into the duct. The air is introduced at the exit end of the oven and exits from the duct at the entrance end of the oven.

The end closest to the introduction of air is closed while the discharge end is open. The juxta position of the ducts and the ceiling heating elements create a differential so that the temperature at the centre of the oven is approximately 350° F.

Preferably, the apparatus and cups are selected to process 3 oz. of batter in each cup. However, it is understood that the quantity of batter and size of cup may be varied, and other quantities and sizes are suitable as well. It will also be appreciated that the operating cycle can be adjusted via programming of the control unit 18 to bake different sizes and types of cheesecake. For example, the temperature of the oven can be increased and the speed of the main conveyor increased, depending on the contents of the batter to be baked.

In any event, the present process and apparatus insures baking of cheesecake with the highest purity and with an extended, virtually indefinite shelf life. The processing of the baked cheesecake in the hot oven and under the sterile HEPA atmosphere acts to kill bacteria in and on the batter.

From the foregoing description, it can be seen that the present invention comprises an apparatus and method for making cheesecake. It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. Apparatus for producing non-refrigerated cheesecake having extended shelf-life comprising:

a baking oven having an entrance at one end, an exit at the other end and a conveyor conveying cheesecake batter in individual cups from one end to the other;

a cooling table in line abutment with the conveyor at the other end of the oven, for directly receiving said cups from the oven;

a hood covering said cooling table; and means for introducing sterile air into said hood as to create a downward laminar sterile air flow enveloping said cooling table, said hood being spaced from the other end of the oven a distance in which the flow of sterile air from the cooling table and the flow of heated vapor from the oven maintain the cheesecake under a decreasing heat and sterile condition, as it moves from the oven to the cooling table.

2. The apparatus according to claim 1, wherein the oven comprises an open ended heating tunnel having means for introducing the heat at the ceiling of the tunnel and heat sink means at the floor of the tunnel for absorbing heat so that at the level said cups move through the oven, the baking temperature is maintained within the range of about 350°–375° Fahrenheit.

3. The apparatus according to claim 1, including means for sealing said cooled cups, said hood extending over and covering said sealing means.

4. The apparatus according to claim 1, including means for delivering a plurality of cups filled with batter in a line transverse to the movement of the oven conveyor and means for moving said line of cups simultaneously on to the oven conveyor.

5. The apparatus according to claim 1, wherein the conveyor comprises of an air permeable surface so that even heating of the cheesecake batter is obtained.

6. The apparatus according to claim 1, wherein the means for introducing sterile air into the hood comprises a HEPA filter.

7. The apparatus according to claim 1, including means for introducing the downwardly laminar flowing sterile air at a rate of 1416 cubic feet per minute.

8. The apparatus according to claim 1, wherein the hood covering the cooling table extends below the surface of the cooling table.

9. The apparatus according to claim 1, wherein the cooling table includes a plurality of freely rotatable rods, closely spaced and parallel to each other so that each individual cup of cheesecake can rest and move freely over two or more rods simultaneously and the downwardly laminar flowing sterile air envelops and cools the cheesecakes in a top to bottom direction.

10. The apparatus according to claim 1, wherein the cooling table includes a conveyor, said conveyor having an air permeable surface so that each individual cup of cheesecake can rest and move freely and the downwardly laminar flowing sterile air envelops and cools the cheesecake in a top to bottom direction.

11. The apparatus according to claim 3, including means for occluding the downstream end of said hood and for transferring the cups from said cooling table to said sealing means.

12. The apparatus according to claim 1, wherein the cooling table includes a motor driven turntable provided with guide means spaced above its upper surface by which the cooled cheesecake cups are arranged into a single file for transfer onto a single line conveyor for sealing and thereafter discharging from the apparatus.

13. The apparatus according to claim 3, including control means for operating the speed of the oven conveyor, the introduction of sterile air and the speed of sealing means.

* * * * *